Figure 1:
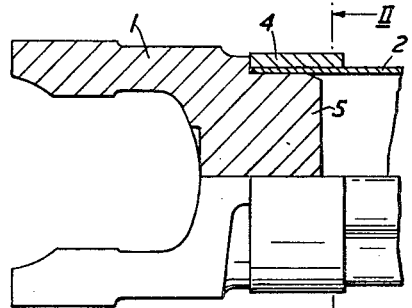

Nov. 14, 1961    D. BASTOW ET AL    3,008,310
ATTACHMENT OF COUPLING MEMBERS TO TORQUE-TRANSMITTING TUBULAR
SHAFTS, AND TO THE TUBULAR SHAFTS AND ATTACHED COUPLING
MEMBERS RESULTING THEREFROM
Filed Nov. 6, 1959

INVENTORS
DONALD BASTOW
EDWARD J. RABSON
BY
ATTORNEY 3,008,310
ATTACHMENT OF COUPLING MEMBERS TO TORQUE-TRANSMITTING TUBULAR SHAFTS, AND TO THE TUBULAR SHAFTS AND ATTACHED COUPLING MEMBERS RESULTING THEREFROM
Donald Bastow, Stratford-on-Avon, and Edward John Rabson, Radford Semele, England, assignors to Birfield Engineering Limited, London, England
Filed Nov. 6, 1959, Ser. No. 851,414
Claims priority, application Great Britain Nov. 10, 1958
4 Claims. (Cl. 64—1)

This invention relates to the attachment of coupling members to torque-transmitting tubular shafts, such as the propeller shafts of motor vehicles and the shafts used for driving implements from the power take-off shafts of agricultural tractors, and to the tubular shafts and attached coupling members resulting therefrom.

The main object of the invention is to provide an improved attachment method which has the advantage of being an easy production operation and also enables replacement of tubular shafts by parts stockists in the field of use, if this should prove necessary, and an efficient and economical tubular shaft with attached coupling member resulting from the method.

According to the invention a method of attaching a coupling member to a torque-transmitting tubular shaft comprises surrounding the end of the tubular shaft, to which the coupling member is to be attached, by an encircling and substantially fitting collar of greater wall thickness than that of the tubular shaft and forcing a spigot portion of the coupling member into the surrounded end of the tubular shaft by means of an interference fit whereby the coupling member, tubular shaft and collar are firmly held together as a torque-transmitting assembly.

The resulting torque-transmitting assembly comprises a tubular shaft of relatively small wall thickness, an encircling collar of relatively great wall thickness surrounding one end of the tubular shaft and a coupling member having a spigot portion engaged within said surrounded end of the tubular shaft by means of an interference fit to hold the coupling member, tubular shaft and collar firmly together.

Preferably the axial length of the collar is unequal to the length of spigot overlapped by the tubular shaft so that one extends beyond the other inwardly of the shaft in the completed assembly. With advantage, relief may be provided between the tubular shaft and the collar and/or between the spigot and the tubular shaft. Thus, a fluted tubular shaft, i.e. a shaft the wall of which is formed with one or more re-entrant portions or flutes, may be employed in conjunction with a circular collar; another possible combination is the use of a circular tube and a circular collar in conjunction with a spigot provided with one or more longitudinally extending recesses, flats or flutes to provide the relief.

The coupling member may be a component of a universal joint to be used in association with the tubular shaft. For example, it may be a yoke member of a universal joint of the Hooke's coupling type. The collar may comprise the inner race of an anti-friction bearing for a stationary guard surrounding the shaft, being provided with a groove extending circumferentially of its outer surface for this purpose.

Due to the invention heating of the tubular shaft and/or the coupling member, as would be necessary in the case of welding the two parts together, is avoided as a result of which certain other advantages accrue. Thus, for example, the attachment method of the invention may be applied where the coupling member and/or the tubular shaft to which it is to be attached are made of materials of which the structure would be adversely affected under the heat necessary for welding or, for example, where the material of one or other of the two parts to be attached are not capable of being welded. For example, in the first case, the coupling member may be of pearlitic malleable iron which, under the heat necessary for welding, would become brittle and so lose its required physical properties while, in the second case, the coupling member may be of iron and the tubular shaft of aluminium or titanium, or alloys thereof.

Figure 2:
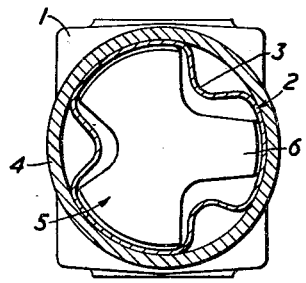
Figure 3:
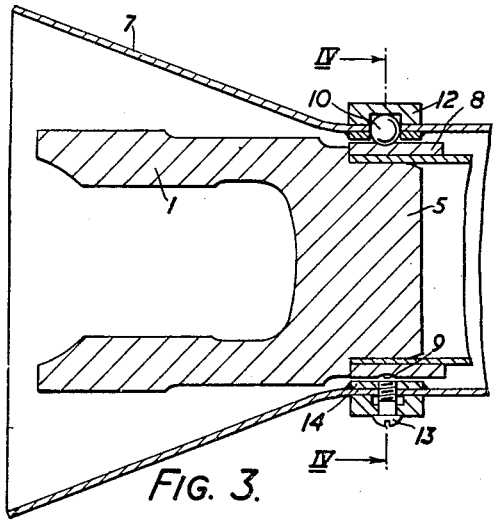
Figure 4:
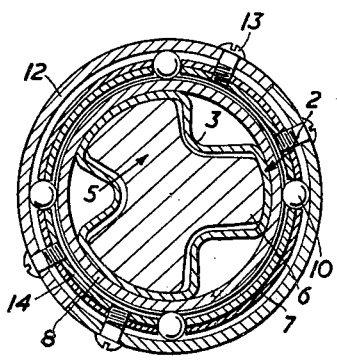
Figure 5:
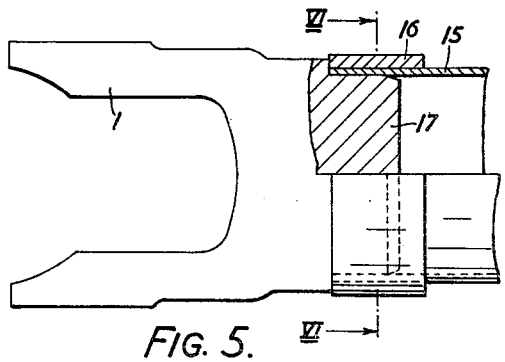
Figure 6:
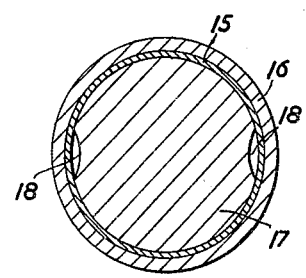

The invention will now be further described with reference to the accompanying drawings which illustrate, by way of example, three torque-transmitting assemblies in accordance with the invention, and in which:

FIGURE 1 is a part-sectional side view of an end portion of one of the assemblies, FIGURE 2 is a sectional view on the line II—II in FIGURE 1, FIGURE 3 is a fully-sectioned view generally similar to that of FIGURE 1 but illustrating another of the assemblies, FIGURE 4 is a sectional view on the line IV—IV in FIGURE 3, FIGURE 5 is a view similar to that of FIGURE 1 but illustrating the remaining assembly, and FIGURE 6 is a sectional view on the line VI—VI in FIGURE 5.

Each of the illustrated arrangements is intended for use as a torque-transmitting assembly for driving an implement from the power take-off shaft of an agricultural tractor, and comprises a coupling member 1 in the form of a yoke member of a universal joint of the Hooke's coupling type which is a pearlitic malleable iron casting.

Referring particularly to the assembly of FIGURES 1 and 2, a tubular shaft 2 of the assembly is welded from mild steel strip. The shaft 2 is formed with three angularly separated re-entrant portions or flutes such as 3 for telescopic engagement with a similarly fluted tubular shaft (which is not illustrated) to afford a driving connection while accommodating plunge, as described in the specification of our copending patent application Serial No. 825,165.

The tubular shaft 2 is surrounded at the end adjacent the member 1 by a mild steel collar 4 the wall thickness of which is several times, for example three times, as great as the wall thickness of the tubular shaft 2. The collar 4 is of plain circular shape and is a fairly close fit on the circular arcuate portions of the tubular shaft 2 between the re-entrant portions or flutes 3.

With the collar 4 slid on to the end of the tubular shaft 2 so that the ends of the collar 4 and shaft 2 are flush with each other, a spigot portion 5 of the yoke member 1 is forced into the surrounded end of the tubular shaft 2. The degree of interference may be of the order of .015 in. on the diameter in a typical case, the spigot portion 5 being provided with the necessary lead to enable it to be entered into the tubular shaft 2 and driven home until the flush ends of the tubular shaft 2 and collar 4 abut a shoulder at the root end of the spigot portion 5. The collar 4 is of somewhat greater length than the length of spigot portion 5 overlapped by the tubular shaft 2 in order to avoid a sudden change in total torque-transmitting cross-section.

The spigot portion 5 is of three-lobed shape in cross-section, the lobes such as 6 fitting within the arcuate portions of the tubular shaft wall between the re-entrant portions or flutes 3. Clearance in an angular direction may be left between the lobes 6 of the spigot profile and the ends of the arcuate portions of the shaft profile, but the peripheral external surfaces of the lobes 6 are convexly arcuate to match the curvature of the concavely arcuate internal surfaces of the portions of the shaft 2 with which they engage so that the interference fit between the spigot portion 5 and the tubular shaft 2 acts to press the arcuate portions of the latter outwardly into firm engagement with the collar 4. The relief between the collar 4 and tubular shaft 2 provided by the re-entrant portions or flutes 3 in the latter enables a greater degree of interference to be utilised between the spigot portion 5 and the tubular shaft 2 without overstressing the latter. This in turn permits wider manufacturing tolerances on the inside diameter of the collar 4 and the diameter of the spigot portion 5.

In the arrangement of FIGURES 3 and 4 a stationary guard 7 is provided for the tubular shaft 2 and universal joint, such guard consisting essentially of a tubular portion coaxial with the tubular shaft 2 and having an outwardly flared or funnel-shaped portion at its end around the yoke member 1 to permit varying degrees of angularity of the universal joint with respect to the tubular shaft 2.

The construction of the tubular shaft 2 and spigot portion 5 is substantially identical to those of the arrangement already described, and like reference numerals are used for these parts. A collar 8, generally similar in shape and function to the collar 4 of FIGURES 1 and 2, surrounds the end of the tubular shaft 2 and has a circumferential groove 9 to form the inner race of a ball bearing interposed between the stationary guard 7 and the torque-transmitting assembly. This ball bearing comprises four balls such as 10 which run in the groove 9 and project through apertures in the tubular portion of the guard 7 so that the latter in effect acts as a cage for the bearing.

An outer race 12 of the bearing is mounted on the guard 7 so as to surround the latter, being attached thereto by means of screws such as 13. A shell 14 within the guard 7 is attached to the latter by welding and has apertures for the balls 10 so that it acts to reinforce the guard 7 in the region of the ball bearing.

In both the assemblies of FIGURES 1 to 4, one of the lobes 6 is of different profile as compared with the remaining lobes. As a result the shaft 2 can only be telescopically engaged with the corresponding non-illustrated shaft in one relative angular position about the shaft axis. Thus two shafts can be engaged and disengaged at will without affecting the relative phase angle of the universal joints respectively attached to the shafts.

The assembly of FIGURES 5 and 6 utilises a tubular shaft 15 of circular profile and a substantially fitting circular collar 16 similar in form and function to the collar 4 of FIGURES 1 and 2. The spigot portion 17 of the yoke member 1 is of circular cross-section provided with a pair of diametrically opposed arcuate or scalloped recesses 18 to afford relief between the spigot portion 17 and the tubular shaft 15.

We claim:

1. A torque-transmitting assembly comprising a tubular shaft having at one end circumferential portions which provide concavely arcuate internal surfaces, a coupling member having a spigot portion received within said one end of the shaft, said portion having at least two convexly arcuate external surfaces engaged with said internal surfaces by means of an interference fit, said external surfaces being separated by grooves in the spigot portion dimensioned to permit deformation of the shaft end consequent upon said interference fit, and a collar having a bore of constant cross-sectional area throughout its length encircling said one end of the shaft so that said circumferential portions of the shaft end are gripped between the collar and said external surfaces of the spigot portion.

2. A torque-transmitting assembly comprising a tubular shaft having at one end circumferential portions which provide concavely arcuate surfaces, said surfaces being separated by inwardly extending flutes in the shaft end, a coupling member having a spigot portion received within said one end of the shaft, said portion having at least two convexly arcuate external surfaces engaged with said internal surfaces by means of an interference fit, said external surfaces being separated by grooves in the spigot portion dimensioned to accommodate said flutes and to permit deformation of the shaft end consequent upon said interference fit, and a collar having a bore of constant cross-sectional area throughout its length encircling said one end of the shaft so that said circumferential portions of the shaft end are gripped between the collar and said external surfaces of the spigot portion.

3. A torque-transmitting assembly comprising a tubular shaft made of a metal selected from the group consisting of mild steel, aluminum, titanium, alloys of titanium and alloys of aluminum, said shaft having at one end circumferential portions which provide concavely arcuate internal surfaces, a coupling member made of pearlitic malleable iron and having a spigot portion received within said one end of the shaft, said portion having at leastt wo convexly arcuate external surfaces engaged with said internal surfaces by means of an interference fit, said external surfaces being separated by grooves in the spigot portion dimensioned to permit deformation of the shaft end consequent upon said interference fit, and a collar having a bore of constant cross-sectional area throughout its length encircling said one end of the shaft so that said circumferential portions of the shaft end are gripped between the collar and said external surfaces of the spigot portion.

4. A shrouded torque-transmitting assembly comprising a tubular shaft having at one end circumferential portions which provide concavely arcuate internal surfaces, a coupling member having a spigot portion received within said one end of the shaft, said portion having at least two convexly arcuate external surfaces engaged with said internal surfaces by means of an interference fit, said external surfaces being separated by grooves in the spigot portion dimensioned to permit deformation of the shaft end consequent upon said interference fit, a cylindrical tubular collar of constant cross-sectional area throughout its length encircling said one end of the shaft so that said circumferential portions of the shaft end are gripped between the collar and said external surfaces of the spigot portion, a fixed tubular guard surrounding the collar and shaft end, an outer bearing race on the tubular guard, and a complementary inner bearing race on the exterior of the collar whereby the collar is rotatably mounted within the guard.

References Cited in the file of this patent

UNITED STATES PATENTS

| | | |
|---|---|---|
| 2,380,952 | Dewey | Aug. 7, 1945 |
| 2,888,283 | Dicken | May 26, 1959 |